United States Patent
Lee et al.

(10) Patent No.: US 6,553,233 B1
(45) Date of Patent: Apr. 22, 2003

(54) METHOD FOR CALCULATING AN OPTIMAL NUMBER OF BTSS IN A WIRELESS NETWORK AND DETERMINING A LOADING FACTOR VALUE THEREFOR

(75) Inventors: Sang-jun Lee, Seoul (KR); Byung-chul You, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/337,134

(22) Filed: Jun. 21, 1999

(30) Foreign Application Priority Data

Jun. 19, 1998  (KR) .............................................. 98/23184

(51) Int. Cl.$^7$ ................................................. H04Q 7/20
(52) U.S. Cl. ...................................... 455/446; 455/453
(58) Field of Search ................................. 455/446, 452, 455/453, 423, 62, 63, 67.1; 370/332, 342

(56) References Cited

U.S. PATENT DOCUMENTS

| | | | |
|---|---|---|---|
| 5,187,810 A | | 2/1993 | Yoneyama et al. |
| 5,293,640 A | * | 3/1994 | Gunmar et al. ............. 455/446 |
| 5,577,029 A | | 11/1996 | Lu et al. |
| 5,761,195 A | | 6/1998 | Lu et al. |
| 5,838,671 A | | 11/1998 | Ishikawa et al. |
| 6,112,091 A | * | 8/2000 | Van Puuenbroek et al. . 455/446 |
| 6,119,009 A | * | 9/2000 | Baranger et al. ........... 455/446 |
| 6,181,917 B1 | * | 1/2001 | Mansour et al. .............. 455/63 |
| 6,445,925 B1 | * | 9/2002 | Kwon et al. ................. 455/446 |

* cited by examiner

*Primary Examiner*—Lester G. Kincaid
(74) *Attorney, Agent, or Firm*—Dilworth & Barrese, LLP

(57) ABSTRACT

A method is disclosed for calculating the optimal number of base transceiver stations (BTSs) in a wireless network and for determining a loading factor value therefor. The wireless network has a plurality of BTSs, each station providing communication service to mobile stations. As a loading factor value increases, the traffic decreases and the coverage area increases. The method calculates the number of BTSs in accordance with a decrease in traffic and the number of BTSs in accordance with an increase in the coverage area; determines a loading factor value which minimizes a difference between the two number of BTSs; and determines the optimal number of BTSs according to the determined loading factor value.

12 Claims, 6 Drawing Sheets

METHOD FOR CALCULATING AN OPTIMAL NUMBER OF BTSS IN A WIRELESS NETWORK AND DETERMINING A LOADING FACTOR VALUE THEREFOR

PRIORITY

This application claims priority to an application entitled "A Method For Calculating Optimal Number of BTSs In A Wireless Network and Determining A Loading Factor Value Therefor" filed in the Korean Industrial Property Office on Jun. 19, 1998 and assigned Serial No. 98-023184, the contents of which are hereby incorporated by reference.

BACKGROUND OF THE INVENTION

1. Field of the Invention

The present invention relates generally to a wireless network and more particularly, to a method for calculating an optimal number of base transceiver stations (BTSs) in a wireless network and for determining loading factor values therefor. Additionally, the method chooses the number of BTSs to satisfy both coverage requirements and an optimum number of subscribers of the wireless network.

2. Description of the Related Art

In a cellular mobile telecommunication system or wireless network, the whole service area is divided into a plurality of coverage areas, that is, cells, each of which includes a base transceiver station (BTS). The BTSs are controlled by a mobile switching center to enable subscribers to continue communicating while moving from one cell to another. BTSs are connected to the mobile switching center via a wire link and the mobile switching center is connected to another mobile switching center or a public switched telephone network (PSTN).

In a cellular mobile telecommunication system, a frequency of a mobile station is not fixed to a specific channel, but is automatically followed by a frequency which a respective BTS designates. Even though neighboring cells must use other frequencies, cells farther away can use the same frequency. Therefore, using this design configuration where a cellular mobile telecommunication system divides a service area into cells and reuses frequencies spatially, the system maintains a high operating efficiency in its usage of various frequencies and hence, it can accommodate many subscribers.

A mobile telecommunication system which uses a code division multiple access (CDMA) technique accommodates a plurality of subscribers on the same frequency by using codes. FIG. 1 is the well-known structure of the CDMA wireless network. In FIG. 1, base transceiver stations (BTSs) 10, 11, 12 and 13, base station controllers (BSCs) 20 and 21 and a mobile switching center 30 are included. Each BTS supports a cell, and the BSC couples a plurality of BTSs to the mobile switching center, which connects a plurality of BSCs to other mobile switching centers (MSC) or to a public switched telephone network (PSTN). Further a visitor location register (VLR) 31 is included which provides information about subscribers to the mobile switching center 30. The mobile switching center 30 uses information about subscribers to provide subscribers with service.

It is important to determine appropriate positions within a cell where a BTS should be placed and to calculate the total number of base transceiver stations in the overall cellular mobile telecommunication system to improve system performance and to minimize costs. The amount of subscribers to be serviced at a given time and the size of the coverage area should be taken into consideration in determining the positions and the total number of BTSs.

A wireless network typically calculates the number of subscribers which a base transceiver station can serve by multiplying a maximal traffic calculated theoretically with a loading factor value, where the loading factor value is the system accommodation limit or the acceptable capacity of the system, namely, the capacity of the load. The loading factor value, which is generally predetermined by the original equipment manufacturer, is generally chosen between 50% and 75%.

The loading factor value should be considered in determining the radius of a cell, since the loading factor value influences interference margin in a service distance analysis table. In other words, as the loading factor value increases, the number of subscribers that can be serviced by a BTS increases, i.e., traffic increases, but the cell radius, i.e., service coverage area, decreases.

In order to calculate acceptable service coverage area of one base station, the interference margin must be considered which provides a maximum allowable path loss (MAPL) between subscribers in cells. The interference margin is obtained by Equation 1:

$$\text{Interference Margin} = 10 \times \log(1 - \text{Loading Factor}). \quad \text{Equation 1}$$

According to this equation, the greater the value of MAPL, the base station is to service a greater service coverage area. Therefore, the service coverage area of one base station is proportional to the maximum MAPL of the base station. The MAPL is in reverse proportion to the loading factor, and hence, the service coverage area of one base station is reverse proportional to the loading factor. Namely, as the loading factor increases, the service coverage area of one base station decreases and the number of BTSs required to cover the whole service coverage area increases.

Accordingly, it is important to take into consideration the loading factor value in the design of a wireless network. In the wireless network, the number of BTSs is given by Equation 2.

$$\text{The number of BTSs} = \text{Max} \, [(\text{the number of BTSs given by the traffic}), (\text{the number of BTSs given by service coverage})] \quad \text{Equation 2}$$

This equation calculates the optimal numbers of BTSs by using the same loading factor value regardless of geographical features, such as the distribution of subscribers in a coverage area. As a result, both the traffic and coverage size are not taken into consideration which are required in determining the loading factor value.

One example of calculating the number of BTSs in a wireless network according to the prior art will now be described. A region A has 100,000 subscribers within a coverage size of 3,000 km$^2$. It is assumed that in terms of morphology, the region A is composed of 10% dense urban district, 20% urban district, 20% suburban district and 50% rural district. Also, it is assumed that 70% of the subscribers exist in a sector-cell and the rest, i.e., 30%, exist in an omni-cell. When a loading factor value is fixed at 50%, 262 BTSs are needed to accommodate the given the amount of subscribers (traffic), but only 88 BTSs are needed to accommodate the given coverage size. Therefore, 262 BTSs are determined as needed, since 262 is greater than 88. Accordingly, in this example, the optimal number of BTSs is determined by the number of subscribers or traffic.

However, a region which has a little traffic is influenced more by the coverage size than by the number of subscribers as the following prior art example illustrates. A region B has 250,000 subscribers within a coverage size of 4,000 km² and has the same morphological make up and distribution of subscribers as the first example. When a loading factor value is fixed as 50%, 66 BTSs are needed to accommodate the given amount of subscribers, but 118 BTSs are needed to accommodate the given coverage size. Therefore, since 118 is greater than 66, the number of BTSs needed is 118. Accordingly, in this second example, the optimal number of BTSs is determined by the coverage size.

As shown by the two examples, there is a big difference between the number of BTSs which accommodates the given traffic conditions and the number of BTSs which accommodates the given coverage size. The examples illustrate that it is inappropriate to apply a loading factor value according to the geographical features of the coverage area. Because the prior art uniformly uses a loading factor value regardless of the geographical features, it is impossible to calculate the number of BTSs to accommodate both the given traffic conditions and the given coverage size.

SUMMARY OF THE INVENTION

It is, therefore, an object of the present invention to provide a method for calculating an optimal number of BTSs by taking into consideration the given traffic conditions and given coverage area size.

It is another object of the present invention to provide a method for properly determining a loading factor value based on geographical features for calculating the optimal number of BTSs.

Other objects and advantages of the present invention will become apparent with reference to the following detailed description and the attached drawings.

The present invention provides, in a wireless network having a plurality of base transceiver stations providing communication service to mobile stations in a given coverage area, a method for calculating an optimal number of base transceiver stations (BTSs). The method includes the steps of calculating a first number of BTSs in accordance with a decrease in traffic as a loading factor value increases, wherein the loading factor value indicates an accommodation limit of each of the BTSs; calculating a second number of BTSs as given by an increase in the coverage area or size as the loading factor value increases; determining a loading factor value which minimizes a difference between the first and second numbers; and determining the optimal number of BTSs based on the determined loading factor value.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

Preferred embodiments of the present invention will be described herein below with reference to the accompanying drawings. In the following description, well known functions or constructions are not described in detail since they would obscure the invention in unnecessary detail.

Figure 4:
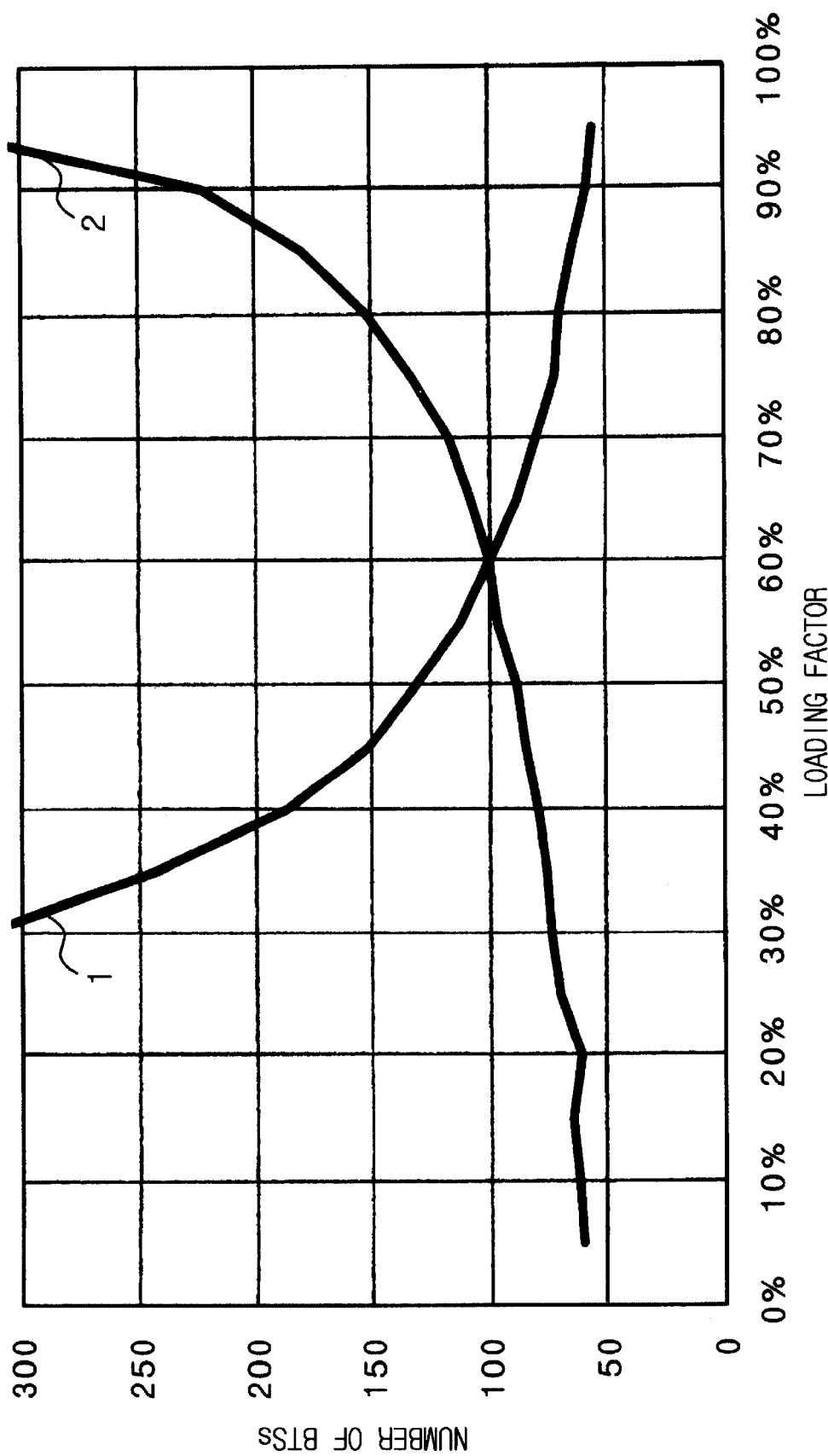
FIG. 4 is a chart illustrating a relationship between a number of BTSs and the loading factor value.

The present invention provides, in a wireless network having a plurality of base transceiver stations (BTSs) providing communication service to mobile stations in a given service coverage area, a method for calculating an optimal number of BTSs. The method includes the steps of calculating a first number of BTSs in accordance with a decrease in traffic as a loading factor value increases, wherein the loading factor value is an accommodation limit of each of the BTSs; calculating a second number of BTSs in accordance with an increase in the coverage area as the loading factor value increases; determining a loading factor value which minimizes a difference between the first and second numbers; and determining the optimal number of BTSs based on the determined loading factor value. Preferably, in the determining step, the loading factor value is chosen at a position where the first and second numbers coincide as described herein below and as shown by FIG. 4. Preferably, the loading factor value is determined according to geographical features of a region being serviced by the wireless network. Therefore, the loading factor value varies according to geographical features of a particular region being serviced by the wireless network.

According to the present invention, the number of BTSs is calculated by the determined loading factor value which is determined according to geographical features of the region being serviced. Preferably, the determined loading factor value is selected to be approximately 60%. Hence, the number of BTSs in the wireless network corresponds to the number of BTSs when the loading factor value is 60%.

In accordance with another embodiment of the present invention, in a wireless network having a plurality of BTSs providing communication service to mobile stations in a given service coverage area, a method is provided for calculating optimal numbers of BTSs. The method includes the steps of calculating a first number of BTSs in accordance with a decrease in traffic as a loading factor value increases, wherein the loading factor value is an accommodation limit of each of the BTSs; calculating a second number of BTSs in accordance with an increase in the coverage area as the loading factor value increases; and determining a loading factor value which minimizes a difference between the first and second numbers. Preferably, in the determining step, the loading factor value is chosen at a position where the first and second numbers coincide as described herein below. Preferably, the loading factor value is selected to be approximately 60%, and it is preferably determined according to geographical features of a region being serviced by the wireless network.

Referring to the drawings, the operational principle of the present invention will now be described in greater detail. For this detailed description, it is assumed that a region C has 50,000 subscribers within a service coverage area of 3,000 km².

Figure 1:
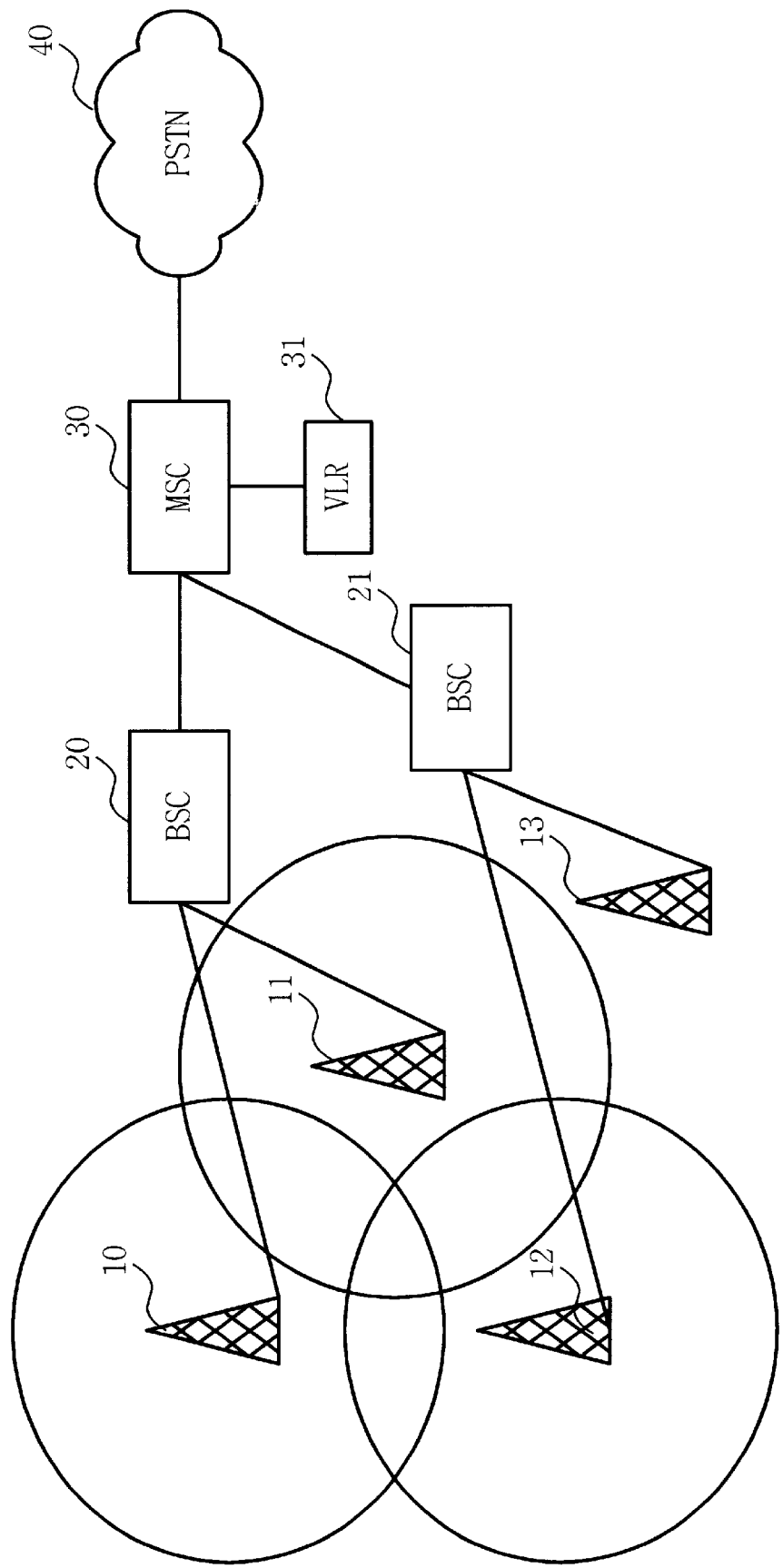
FIG. 1 illustrates a code division multiple access wireless network.
Figure 2:
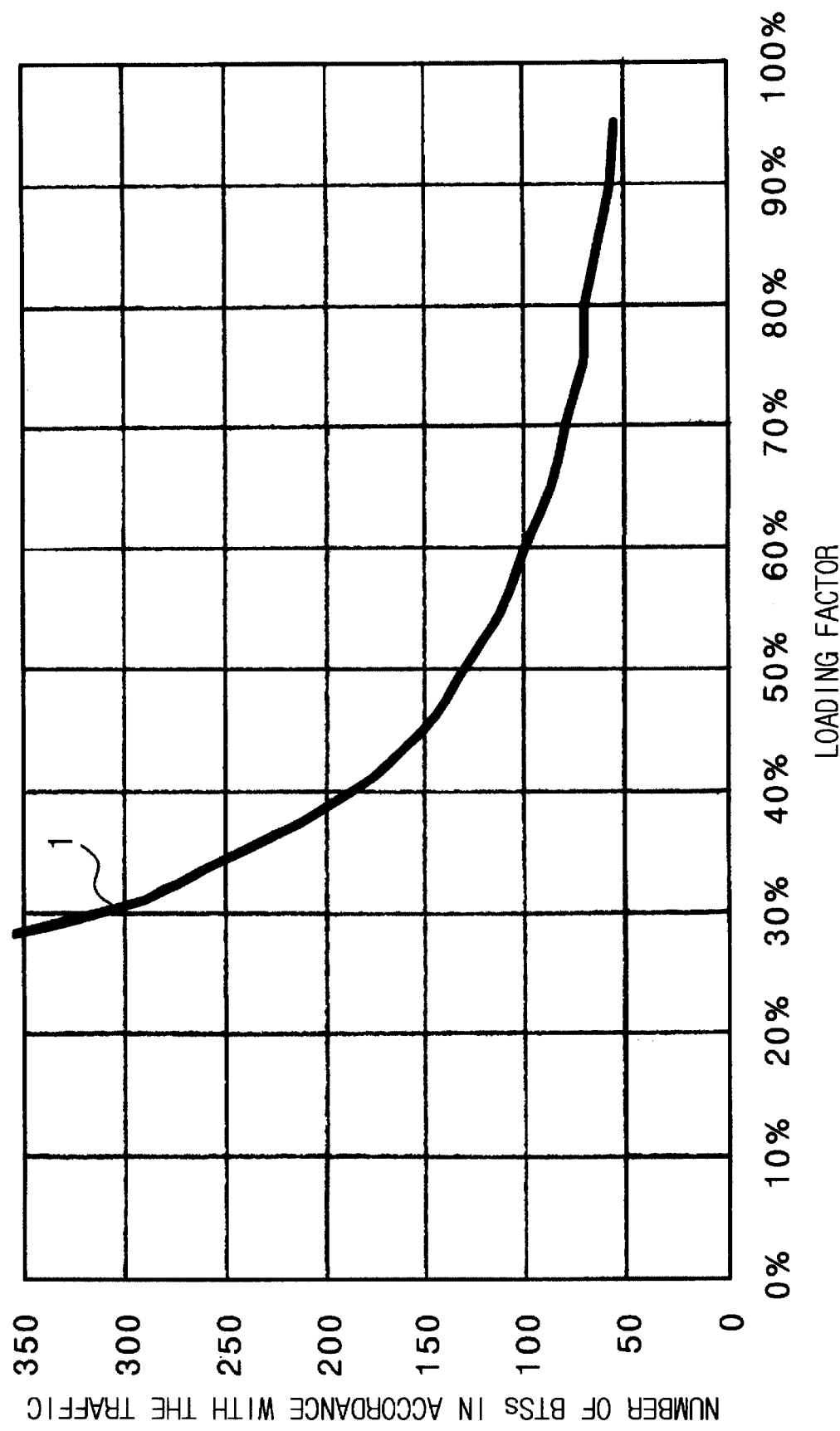
FIG. 2 is a chart illustrating a relationship between a number of BTSs in accordance with system traffic and a loading factor value.
Figure 3:
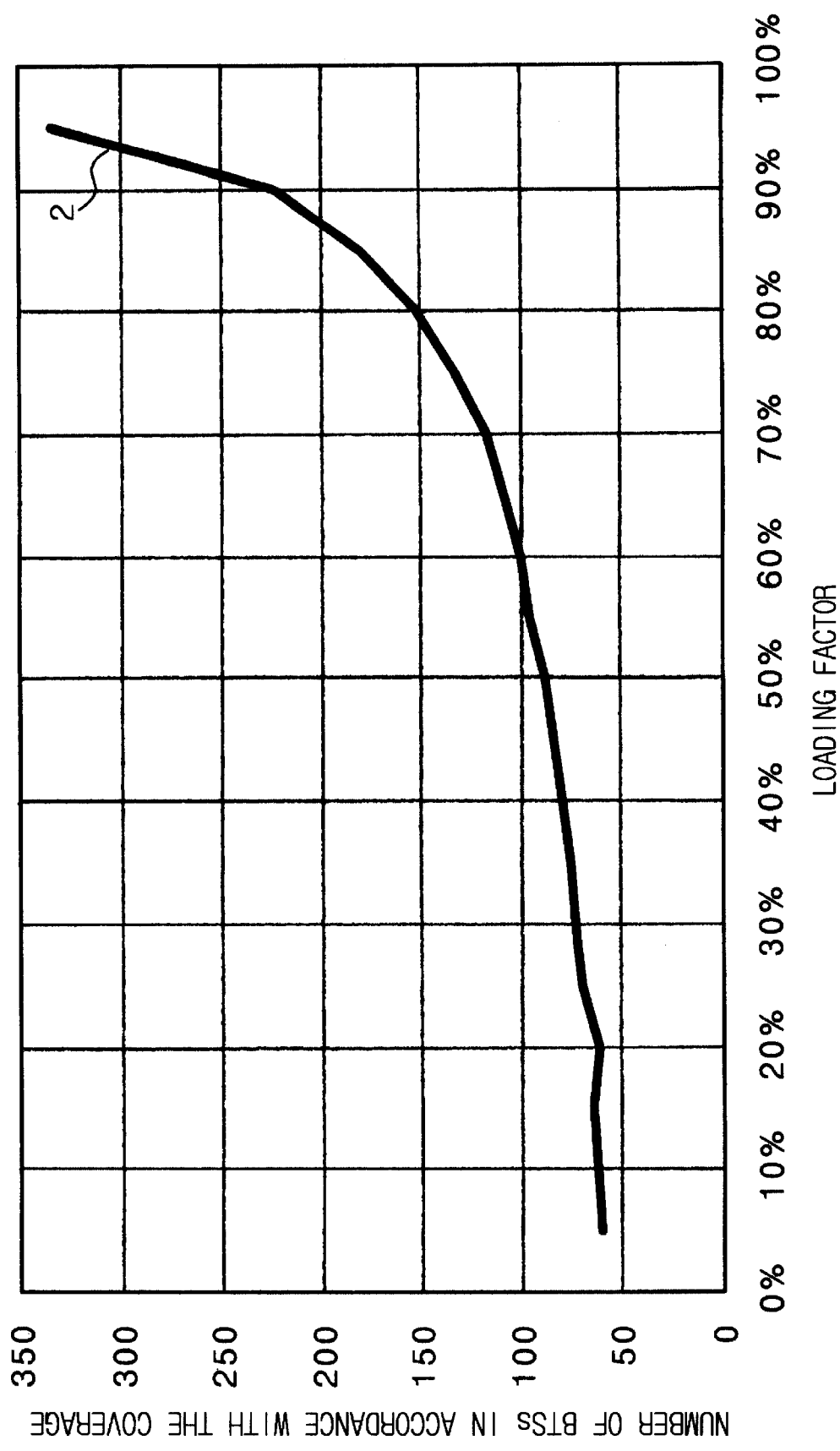
FIG. 3 is a chart illustrating a relationship between a number of BTSs in accordance with the coverage size and the loading factor value.

Suppose that region C is composed of 10% dense urban district, 20% urban district, 20% suburban district and 50% rural district in terms of morphology. Also, suppose that 70% of the subscribers are in a sectorized cell and the other 30% are in an omni-cell. FIG. 2 is a chart illustrating a relationship between the number of BTSs in accordance with the traffic and a loading factor value. As shown in FIG. 2, as the loading factor value increase, the number of BTSs in accordance with the traffic decreases. FIG. 3 is a chart illustrating a relationship between the number of BTSs in accordance with the coverage size and a loading factor value. As shown in FIG. 3, as the loading factor value increase, the number of BTSs in accordance with the coverage size increases. According to FIGS. 2 and 3, the number of BTSs changes in accordance with a change in the loading factor value. The number of BTSs in accordance with the coverage size does not have a great influence within a region where the traffic is heavy. However, the level of traffic has a great influence in determining the optimal number of BTSs for the wireless network.

On the other hand, within a region where the coverage size is large as compared to the amount of subscribers within the region, the coverage size has a great influence in determining the optimal number of BTSs. As a result, by considering both the traffic and the coverage size of a region being serviced by the wireless network, a suitable loading factor value is determined to be used in calculating the optimal number of BTSs. Accordingly, the present invention therefore provides a method of determining a loading factor value which minimizes a difference between the number of BTSs given by the traffic and the number of BTSs given by the coverage size, and uses the determined loading factor value for calculating the optimal number of BTSs for designing an efficient wireless network using less resources.

FIG. 4 is a chart illustrating a relationship between the number of BTSs and the loading factor values for the example stated above with reference to FIGS. 2 and 3. With reference to FIG. 4, as the loading factor value increase, the number (first number) of BTSs given by the traffic decreases and the number (second number) of BTSs given by the coverage size increases. The number of BTSs given by the traffic and the number of BTSs given by the coverage size meet at a position where a loading factor value is approximately 60%. Therefore, 60% is determined to be an optimal loading factor value and hence, the optimal number of BTSs is determined to be approximately 100 for this example. Under different factors, conditions, and geographical features of the region being serviced, the optimal loading factor value will vary.

Figure 5:
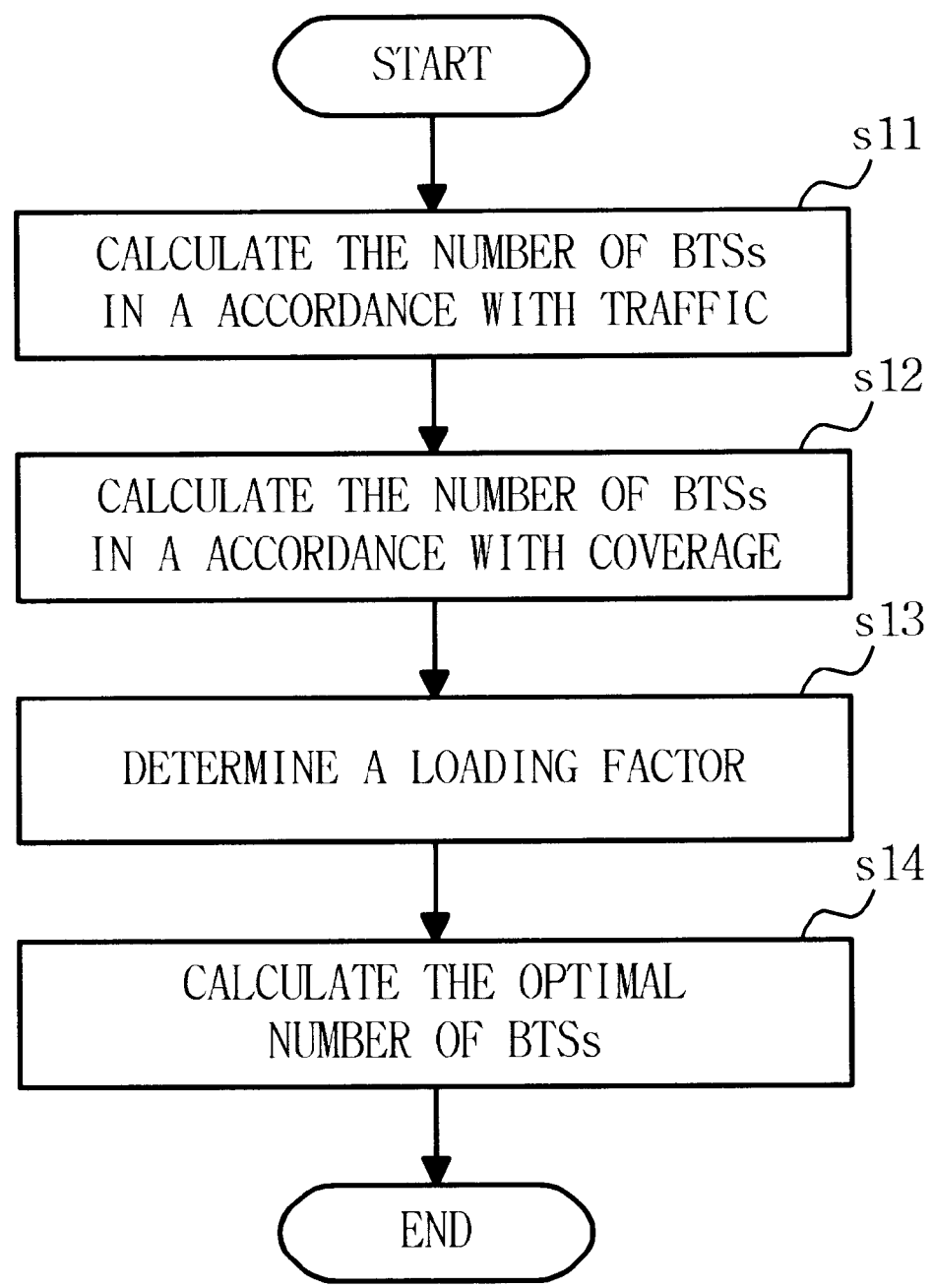
FIG. 5 is a flow chart illustrating a method for calculating an optimal number of BTSs in a wireless network according to the present invention.

FIG. 5 is a flow chart illustrating a method for calculating the optimal number of BTSs in a wireless network according to the principles of the present invention. In the wireless network having a plurality of base transceiver stations to serve a plurality of mobile stations within a certain coverage area, the method includes the steps of calculating the number of BTSs given by a decrease in traffic as a loading factor value increases (step 11, see FIG. 2) and calculating the number of BTSs given by an increase in the coverage area as a loading factor value increases (step 12, see FIG. 3).

According to the method, an optimal loading factor value is determined which minimizes a difference between the number of BTSs given by a decrease in traffic and the number of BTSs given by an increase in the coverage area (step 13), and the optimal number of BTSs is calculated based on the determined loading factor value (step 14).

Figure 6:
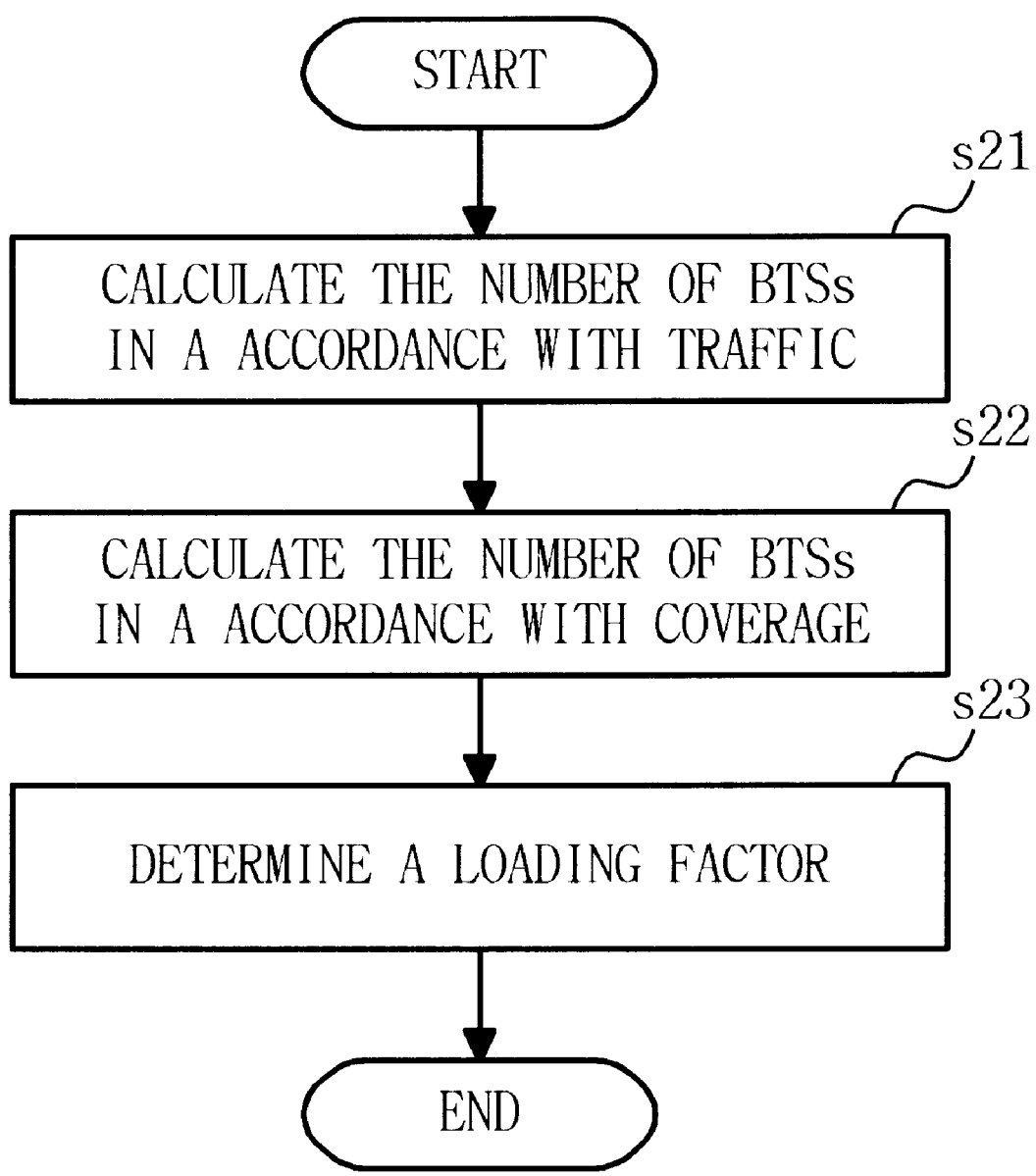
FIG. 6 is a flow chart illustrating a method for determining a loading factor value for calculating the optimal number of BTSs in a wireless network according to the present invention.

FIG. 6 is a flow chart illustrating a method of the present invention for determining an optimal loading factor value to be used in calculating an optimal number of BTSs in a wireless network. In the wireless network having a plurality of BTSs to serve a plurality of mobile stations within a particular coverage area, the method includes the steps of calculating a number of BTSs in accordance with a decrease in traffic as a loading factor value increases (step 21) and calculating a number of BTSs in accordance with an increase in the coverage area size as a loading factor value increases (step 22). According to the method, the optimal loading factor value is determined which minimizes a difference between the number of BTSs in accordance with a decrease in traffic and the number of BTSs in accordance with an increase in the coverage area size (step 23).

The present invention provides advantages in calculating an optimal loading factor value for a wireless network in accordance with geographical features of the region being serviced by the wireless network. In other words, both the traffic and the service coverage area of the region being serviced are taken into consideration, such that a loading factor value is determined which reflects the geographical features of the region being serviced. The determined loading factor value is then used to calculate the optimal number of BTSs.

While the invention is susceptible to various modification and alternative forms, specific embodiments thereof have been shown by way of example in the drawings and detailed description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. A method for calculating an optimal number of base transceiver stations (BTSs) in a wireless network having a plurality of BTSs providing communication service to mobile stations in a coverage area, said method comprising the steps of:

calculating a first number of BTSs in accordance with a decrease in traffic as a loading factor value increases, wherein the loading factor value is an accommodation limit of each of the BTSs;

calculating a second number of BTSs in accordance with an increase in the coverage area as the loading factor value increases;

determining a loading factor value using the first and second numbers; and determining the optimal number of BTSs based on the determined loading factor value.

2. The method as set forth in claim 1, wherein in said determining a loading factor value step, said loading factor value is chosen at a position where the first number coincides with the second number.

3. The method as set forth in claim 1, wherein in said determining a loading factor value step, said loading factor value is determined to be a loading factor value which minimizes a difference between the first and the second number.

4. The method as set forth in claim 1, wherein said loading factor value is determined according to geographical features of a region being serviced by the wireless network.

5. The method as set forth in claim 1, wherein in said determining the optimal number of BTSs step, the optimal number of BTSs is determined to be a number of BTSs corresponding to the determined loading factor value.

6. The method as set forth in claim 1, wherein said determined loading factor value is 60%, and the optimal number of BTSs is a number of BTSs corresponding to the determined loading factor value of 60%.

7. A method for determining an optimal loading factor value in a wireless network having a plurality of BTSs to serve a plurality of mobile stations within a particular coverage area, the method includes the steps of:

calculating a number of BTSs in accordance with a decrease in traffic as a loading factor value increases, wherein the loading factor value is an accommodation limit of each of the BTSs;

calculating a number of BTSs in accordance with an increase in the coverage area size as a loading factor value increases; and determining the optimal loading factor value as the loading factor value which minimizes a difference between the number of BTSs in accordance with a decrease in traffic and the number of BTSs in accordance with an increase in the coverage area size.

8. The method as set forth in claim 7, wherein in said determining step, the optimal loading factor value is determined to be the loading factor value where the number of BTSs in accordance with a decrease in traffic coincides with the number of BTSs in accordance with an increase in the coverage area size.

9. The method as set forth in claim 7, wherein in said determining step, the optimal loading factor value is determined to be a loading factor value which minimizes a difference between the number of BTSs in accordance with a decrease in traffic and the number of BTSs in accordance with an increase in the coverage area size.

10. The method as set forth in claim 7, wherein said determined loading factor value is 60%.

11. The method as set forth in claim 7, wherein in said determining step, the optimal loading factor value is determined according to geographical features of a region being serviced by the wireless network.

12. The method as set forth in claim 7, wherein the determined optimal loading factor value is used to calculate an optimal number of BTSs in the wireless network.

* * * * *